United States Patent
Xiao et al.

(10) Patent No.: US 12,166,399 B2
(45) Date of Patent: Dec. 10, 2024

(54) EXTERNAL ROTOR AIRCRAFT MOTOR HAVING FORCE ISOLATED CANTILEVERED ROTOR

(71) Applicant: Hinetics LLC, Champaign, IL (US)

(72) Inventors: Jianqiao Xiao, Champaign, IL (US); Kiruba S. Haran, Champaign, IL (US)

(73) Assignee: Hinetics LLC, Champaign, IL (US)

( * ) Notice: Subject to any disclaimer, the term of this patent is extended or adjusted under 35 U.S.C. 154(b) by 274 days.

(21) Appl. No.: 17/944,681

(22) Filed: Sep. 14, 2022

(65) Prior Publication Data

US 2023/0082739 A1     Mar. 16, 2023

Related U.S. Application Data

(60) Provisional application No. 63/244,049, filed on Sep. 14, 2021.

(51) Int. Cl.
| | |
|---|---|
| *H02K 5/15* | (2006.01) |
| *B64D 27/24* | (2006.01) |
| *F01D 5/04* | (2006.01) |
| *F16C 19/10* | (2006.01) |
| *H02K 7/00* | (2006.01) |
| *H02K 7/08* | (2006.01) |
| *H02K 9/22* | (2006.01) |
| *H02K 21/22* | (2006.01) |

(52) U.S. Cl.
CPC ............ *H02K 5/15* (2013.01); *B64D 27/24* (2013.01); *F01D 5/04* (2013.01); *F16C 19/10* (2013.01); *H02K 7/003* (2013.01); *H02K 7/085* (2013.01); *H02K 9/227* (2021.01); *H02K 21/22* (2013.01); *F16C 2326/43* (2013.01); *H02K 2205/03* (2013.01)

(58) Field of Classification Search
CPC .......... B64D 27/24; F01D 5/04; H02K 21/22; H02K 2205/03; H02K 5/15; H02K 5/1735; H02K 7/003; H02K 7/085; H02K 7/14; H02K 9/06; H02K 9/227; F16C 19/10; F16C 19/54; F16C 2326/43
See application file for complete search history.

(56) References Cited

U.S. PATENT DOCUMENTS

| | | | | |
|---|---|---|---|---|
| 2009/0284086 | A1* | 11/2009 | Sivasubramaniam | .... F03D 9/25 290/55 |
| 2014/0205480 | A1* | 7/2014 | Nakano | ............... F04D 29/4293 417/420 |
| 2022/0302816 | A1* | 9/2022 | Xiao | ........................ H02K 3/47 |

\* cited by examiner

*Primary Examiner* — Naishadh N Desai
(74) *Attorney, Agent, or Firm* — Boyle Fredrickson, S.C.

(57) ABSTRACT

A high-efficiency, high specific power electric motor/generator for aircraft use provides a cantilevered external rotor removed from load thrust and vibration by an isolator and bearing set between the rotor and stator reducing material demands and weight otherwise required for stiffness to preserve close rotor/stator proximity.

17 Claims, 10 Drawing Sheets

EXTERNAL ROTOR AIRCRAFT MOTOR HAVING FORCE ISOLATED CANTILEVERED ROTOR

CROSS REFERENCE TO RELATED APPLICATION

This application claims the benefit of US provisional application 63/244,049 filed Sep. 14, 2021, and hereby incorporated by reference.

STATEMENT REGARDING FEDERALLY SPONSORED RESEARCH OR DEVELOPMENT

BACKGROUND OF THE INVENTION

The present invention relates to an electrical machine suitable for use in aircraft, and in particular to a high-efficiency, high power density electric motor design.

Electrical motors for aircraft application require high efficiency, for example, to take advantage of energy storage devices such as batteries and the like, and high specific power (power per weight) to reduce unnecessary aircraft weight.

U.S. patent application Ser. No. 17/661,819 filed May 3, 2022, incorporated by reference, and assigned to the assignee of the present invention, describes a permanent magnet motor with an external or outside rotor supported from the shaft of the motor in cantilever by an endplate. An optimized motor design requires an extremely narrow gap between the rotor and the stator, usually one or two millimeters. This necessitates an extremely high shaft stiffness usually addressed by adding more shaft material such as reduces the motor specific power and, in some cases, efficiency.

SUMMARY OF THE INVENTION

The present invention accommodates a close rotor/stator clearance by isolating the rotor and stator separation from forces from the aircraft propeller through a combination of separate support of the propeller against the frame, a bearing coupling between the rotor and stator, and mechanical isolation between the aircraft propeller and either or both of the stator or rotor. Additional improvements in the motor design include an improved heatsink design for the stator providing improved torque transmission and reduced weight by using a two-level design. In one embodiment, the invention provides an electric machine having a frame and a stator providing a stator body having a circumferential periphery supporting a series of electrically independent coils facing outward and spaced therealong. A rotor provides a rotatable shaft passing through the stator to a first end that is attached to an endplate extending radially from the shaft to a periphery having a diameter outside of the stator and joining an end of a permanent magnet form coaxially surrounding the stator and supported in cantilever thereby. A first bearing assembly supports a first portion of the shaft that joins an outer surface of the shaft and an inner portion of the stator restraining relative motion between the stator and rotor to coaxial rotation and a second bearing assembly supports a second portion of the shaft against the frame to restrain relative motion between the second portion of the shaft and the frame to coaxial rotation. A flexible coupler is positioned between at least one of a first portion of the rotatable shaft and a second portion of the rotatable shaft and between the stator and the frame isolating the stator and rotor from relative radial or axial force.

It is thus a feature of at least one embodiment of the invention to facilitate construction of the external rotor cantilevered design with lighter weight materials by force isolation.

The flexible coupler may be an elastically compliant coupler providing a lower constant of elasticity to axial and radial forces than to torsional forces during operation.

It is thus a feature of at least one embodiment of the invention to utilize an elastic element to provide axial and radial compliance without looseness that would promote high impact vibration and the like.

The first and second bearing assemblies may each be a pair of bearings axially spaced in separation along the rotatable shaft. In addition or alternatively, the first and second bearing assemblies may be thrust bearings.

It is thus a feature of at least one embodiment of the invention to provide improved resistance to out-of-axis torsion and axial force.

The stator may provide a set of heatsink fins extending inwardly from the series of electrically independent coils toward the rotatable shaft.

It is thus a feature of at least one embodiment of the invention to employ the space between the shaft and the stator coils for heat removal.

The endplate may include a set of peripheral openings allowing radial airflow out of the endplate and out of the rotor volume.

It is thus a feature of at least one embodiment of the invention to pull air through the heatsink fins and between the stator and rotor to support this architecture.

The endplate may further include a set of radially extending fan blades conducting air to the peripheral openings. In some embodiments these peripheral openings may have center axes tipped from a radial direction away from a direction of rotation.

It is thus a feature of at least one embodiment of the invention to enlist the rotation of the rotor to actively drive air through the stator heatsink fins.

The heatsink fins may be angled with respect to lines of radius perpendicular to an axis of rotation of the shaft.

It is thus a feature of at least one embodiment of the invention to enlist the heatsink fins as torque transmission elements.

Pairs of adjacent fins may diverge symmetrically from the lines of radius as one moves in or out along the lines of radius.

It is thus a feature of at least one embodiment of the invention to provide bidirectional torque transmission, for example, for regeneration.

The fins maybe planar.

It is thus a feature of at least one embodiment of the invention to provide a fin structure that can be readily extruded from aluminum or the like.

In some embodiments, the number of this around a circumference of the shaft may decrease toward the shaft.

It is thus a feature of at least one embodiment of the invention to allow reduced shaft diameter without unnecessarily increasing the weight of the heatsink through inefficient fins close to the shaft diameter.

The endplate may include a set of openings allowing viewing of at east one of the first pair of bearings.

It is thus a feature of at least one embodiment of the invention to allow bearing inspection through the endplate.

The endplate maybe releasably attached to the permanent magnet form with machine screws.

It is thus a feature of at least one embodiment of the invention to allow simplified assembly of the permanent magnets to the magnet form during manufacture without interference from the endplate.

These particular objects and advantages may apply to only some embodiments falling within the claims and thus do not define the scope of the invention.

DETAILED DESCRIPTION OF THE PREFERRED EMBODIMENT

Figure 1:
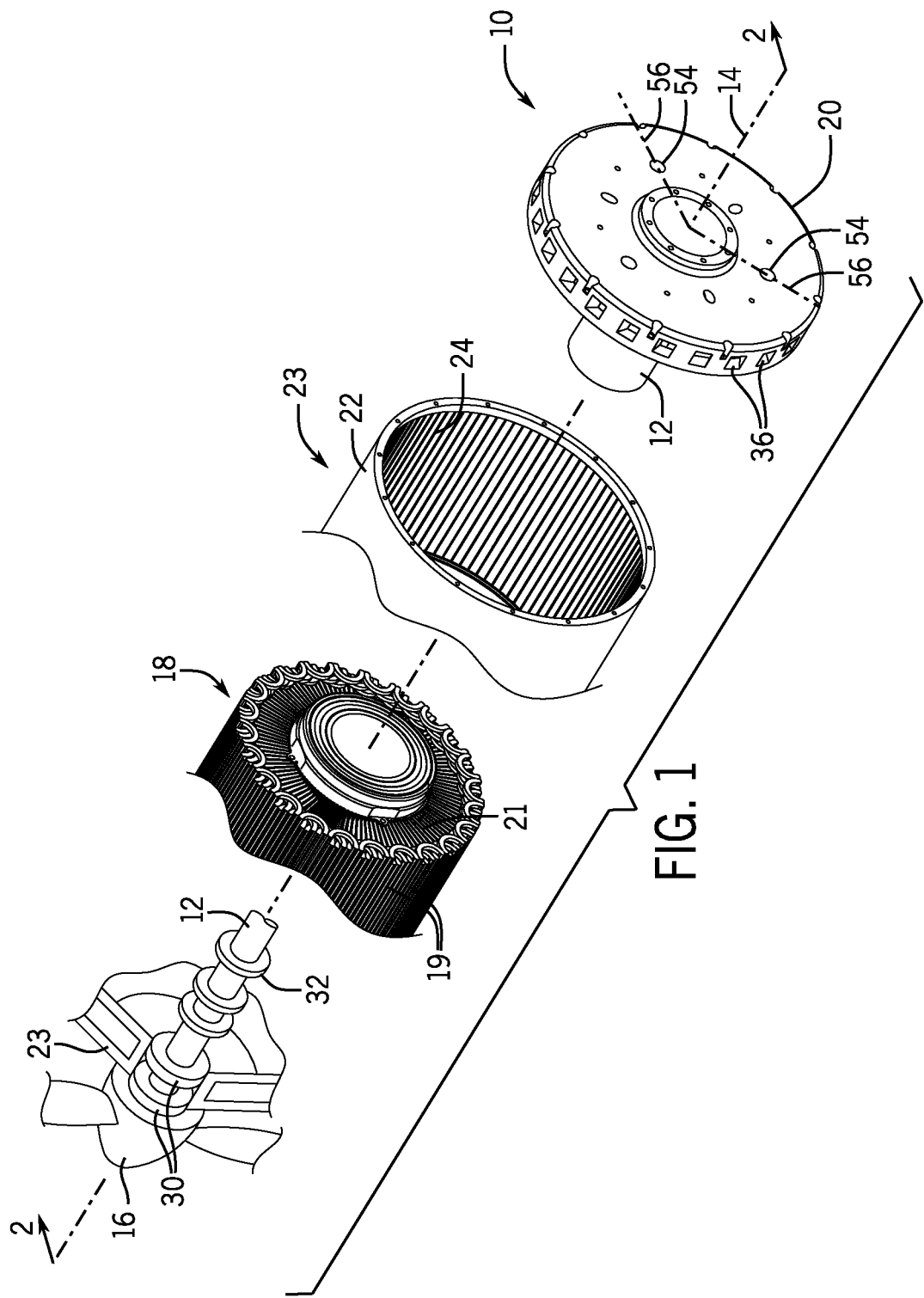
FIG. 1 is an exploded perspective view of the electric machine of the present invention showing the inter-fitting of an external rotor around the central stationary stator.

Referring now to FIG. 1, an electrical machine 10 of the present invention may provide for a central shaft 12 extending along an axis 14 about which the shaft 12 may rotate. The shaft may communicate at a first end with a propeller 16 or similar load, the propeller 16 receiving torque from the electrical machine 10 during operation of the electrical machine 10 as a motor and providing torque to the electrical machine 10 during operation of the electrical machine 10 as a generator during regeneration. The shaft 12 may be a hollow tube to maximize torque transmission with minimized weight.

A front end of a stator 18 may be attached to a fixed structure, for example, an aircraft frame 23 or the like, the outer surface of the stator 18 exposing a set of electrically independent electrical coils 19 arrayed thereabout and extending axially therealong. A set of heatsink fins 21 may extend inwardly from the electrical coils 19 toward the shaft 12 but spaced therefrom to conduct heat away from the electrical coils 19.

The shaft 12 may pass rearwardly from the propeller 16 through the center of the stator 18 and through an opening in the heatsink fins 21 to be received by an endplate 20 fixed to the shaft 12 to rotate therewith. The endplate 20 extends radially from the shaft 12 to an outer periphery outside that of the stator 18. At this outer periphery, the endplate 20 attaches to a rearward lip of a hollow cylindrical permanent magnet frame 22 being part of a rotor 23 that may fit coaxially around the stator 18. The cylindrical permanent magnet frame 22 includes a set of internal affixed permanent magnets 24 that may interact with the electrical fields from the coils 19 as is generally understood in the art. Additional details for the construction of the stator 18, rotor 23, and the permanent magnet frame 22 are provided in U.S. patent application Ser. No. 17/661,819 cited above.

Figure 2:
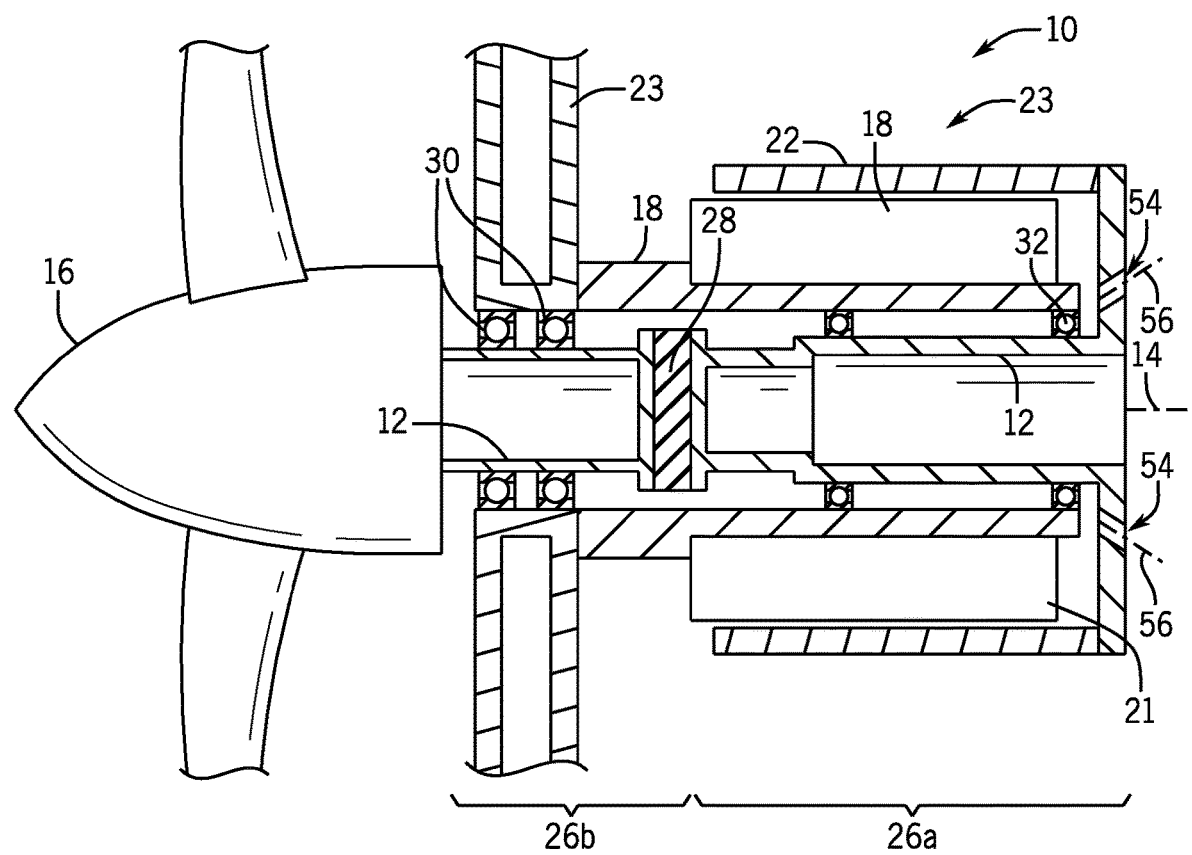
FIG. 2 is an elevational cross-section taken along line 2-2 of FIG. 1 showing separate bearings on opposite sides of a flexible isolator for isolating the cantilevered rotor shaft from thrust, radial, and off-axis torsional forces.

Referring now also to FIG. 2, the shaft 12 may be divided into a first portion 26a within the stator 18 and a second portion 26b forward from the stator 18 and attached to the propeller 16, these two portions 26a and 26b separated by a flexible coupling 28. Generally the flexible coupling 28 will be stiff in torsion but compliant with respect to axial and radial forces or motion and in this respect may be twice as stiff in torsion as axially or radially, for example, considering circumferential and axial displacement at the outer surface of the coupling for small excursions of 1 mm. More generally, the flexible coupling 28 may be an elastically compliant coupler providing a lower constant of elasticity to axial and radial forces than to torsional forces during operation. Suitable designs for the flexible coupling 28 include elastomeric couplings, bellows couplings, and in-line couplings with interengaging teeth.

The first portion 26a of the shaft 12 may be supported by a first set of bearings 30, for example, a pair of ball or roller thrust bearings spaced apart axially to restrain motion of the shaft 12 to rotational motion about the axis 14 only, as braced against the aircraft frame 23. The first set of bearings 30 as so positioned largely absorbs axial and radial forces acting on the shaft portion 26b. Likewise the second portion of the shaft may be supported on a second set of bearings 32 between the shaft 12 and an inner surface of the stator 18. This second set of bearings 32 may also be a pair of ball or roller thrust bearings spaced axially. The second set of bearings 32 preserves the gap between the stator 18 and permanent magnet frame 22 without a need to resist significant radial or thrust forces perpendicular or along axis 14 from the propeller 16. In this way, bearing restraint of the inner surface of the permanent magnet frame 22 and the outer surface of the stator 18 can be done with a lightweight shaft and bearing system and can be insufficiently stiff to prevent the full forces of the propeller 16 from disrupting the narrow gap between the stator and rotor.

Figure 4:
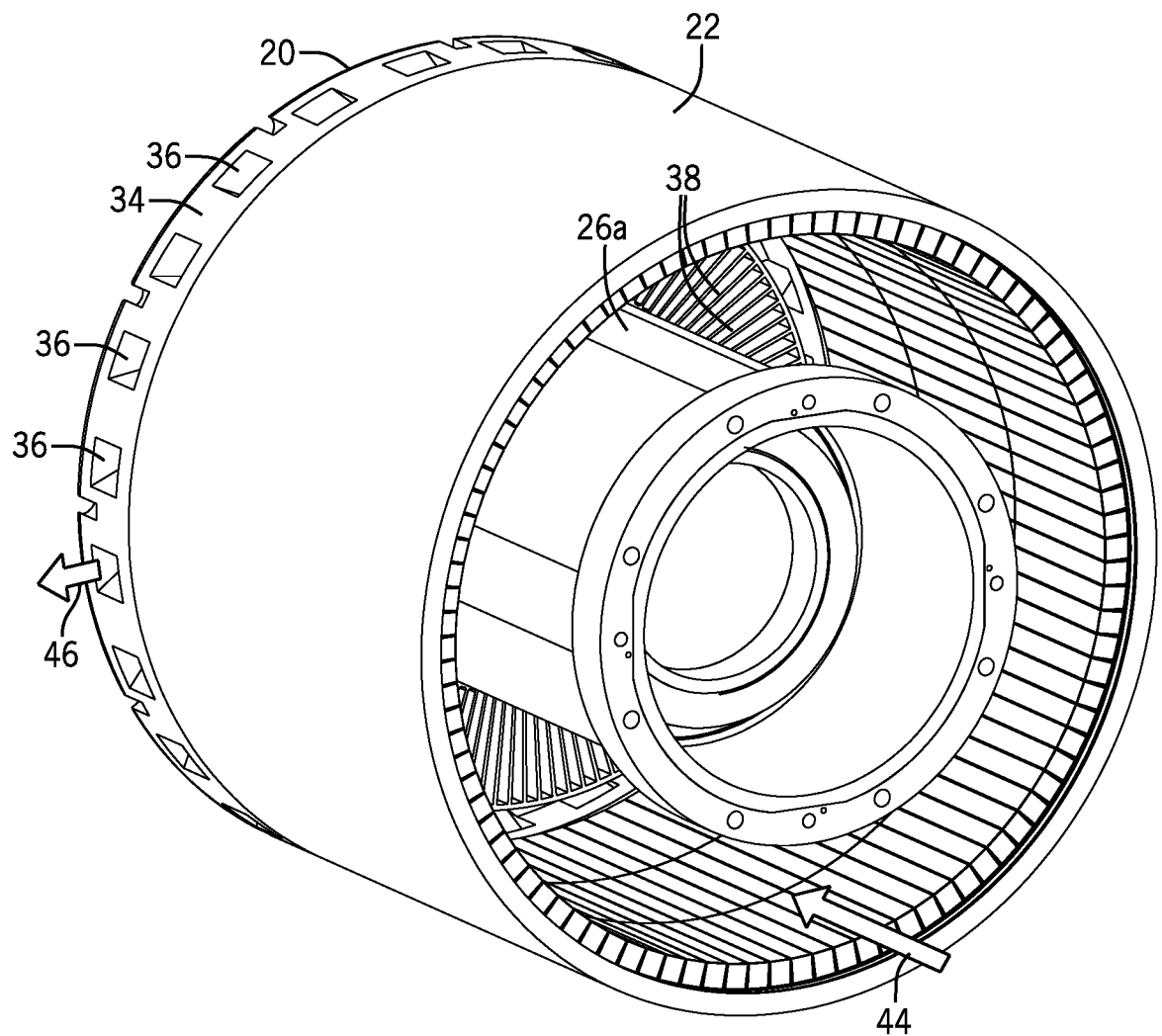
FIG. 4 is a figure similar to FIG. 3 showing an impeller system on the endplate of the rotor and peripheral openings for moving air axially through the rotor volume.

Referring now also to FIG. 4, the endplate 20 may be inwardly concave to provide an outer peripheral cylindrical wall 34 providing regularly spaced openings 36 therethrough. These openings 36 may communicate with an inner radial surface of the endplate 20, the latter supporting impeller fan blades 38 extending inwardly and formed therein. Each fan blade 38 terminates at an opening 36 so as to conduct air captured by the fan blade 38 through the opening 36.

Figure 5:
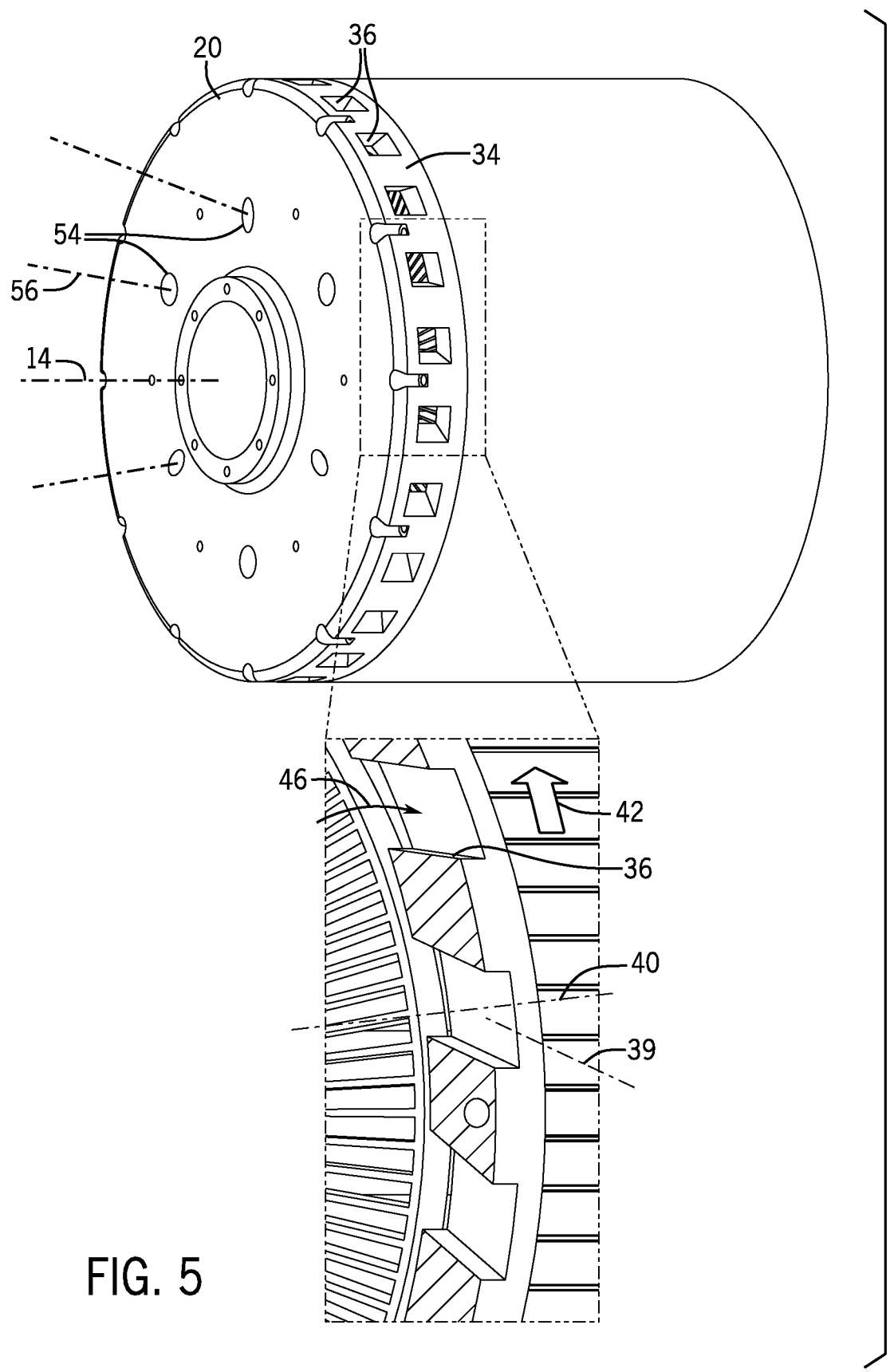
FIG. 5 is a rear perspective view of the endplate of FIG. 4 with an inset showing the tipping of the peripheral openings of the endplate to promote airflow out of these openings during rotation.

Referring momentarily to FIG. 5, each of these openings 36 may have a central axis 39 tipped with respect to a line of radius 40 about the axis 14 away from a direction of rotation 42. This tipping operates together with the impeller fan blades 38 to provide a centrifugal fan expelling air out of the openings 36 and thus drawing air axially from the inner volume of the rotor 22 through the permanent magnet frame 22, as indicated by arrow 44, and out of the openings as indicated by arrow 46. This air will pass between the permanent magnet frame 22 and the stator 18 and will also draw air through the fins 21 (shown in FIG. 1). The exposed ends of the coils 19 subject to concentrated airflow may be shielded, for example, with an epoxy coating or a separate guard attached to the stator 18 to prevent direct impact between the windings of the coils 19 and debris.

Figure 3:
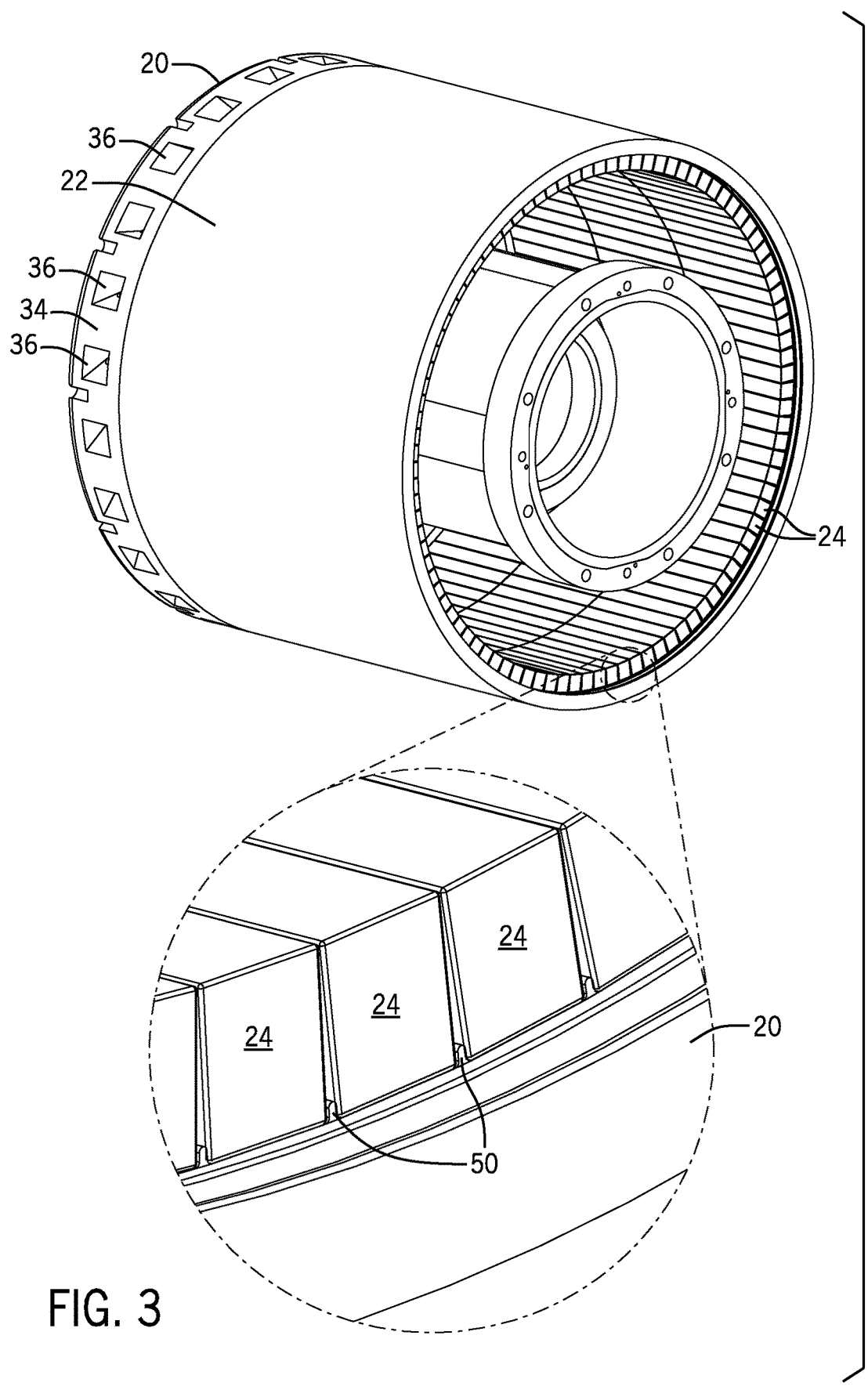
FIG. 3 is a front perspective view of the rotor of FIG. 1 with an inset showing the placement of magnets on the inner surface of the rotor.

Referring now to FIG. 3, an inner surface of the permanent magnet frame 22 is lined with permanent magnets 24, for example, arranged in a Halbach array in a circumferential direction, Proper spacing and assembly of the magnets can be provided by small tabs 50 extending radially inwardly from the permanent magnet frame 22 aligning and spacing the permanent magnets 24 along rows parallel to the axis 14.

Referring specifically to FIGS. 1 and 2 and 5, the endplate 20 may also have a set of openings 54 in its radial face having axes 56 angled with respect to the axis 14 at about 45° such as to allow viewing of the rearmost bearing 32 during assembly from outside of the endplate 20.

Figure 6:
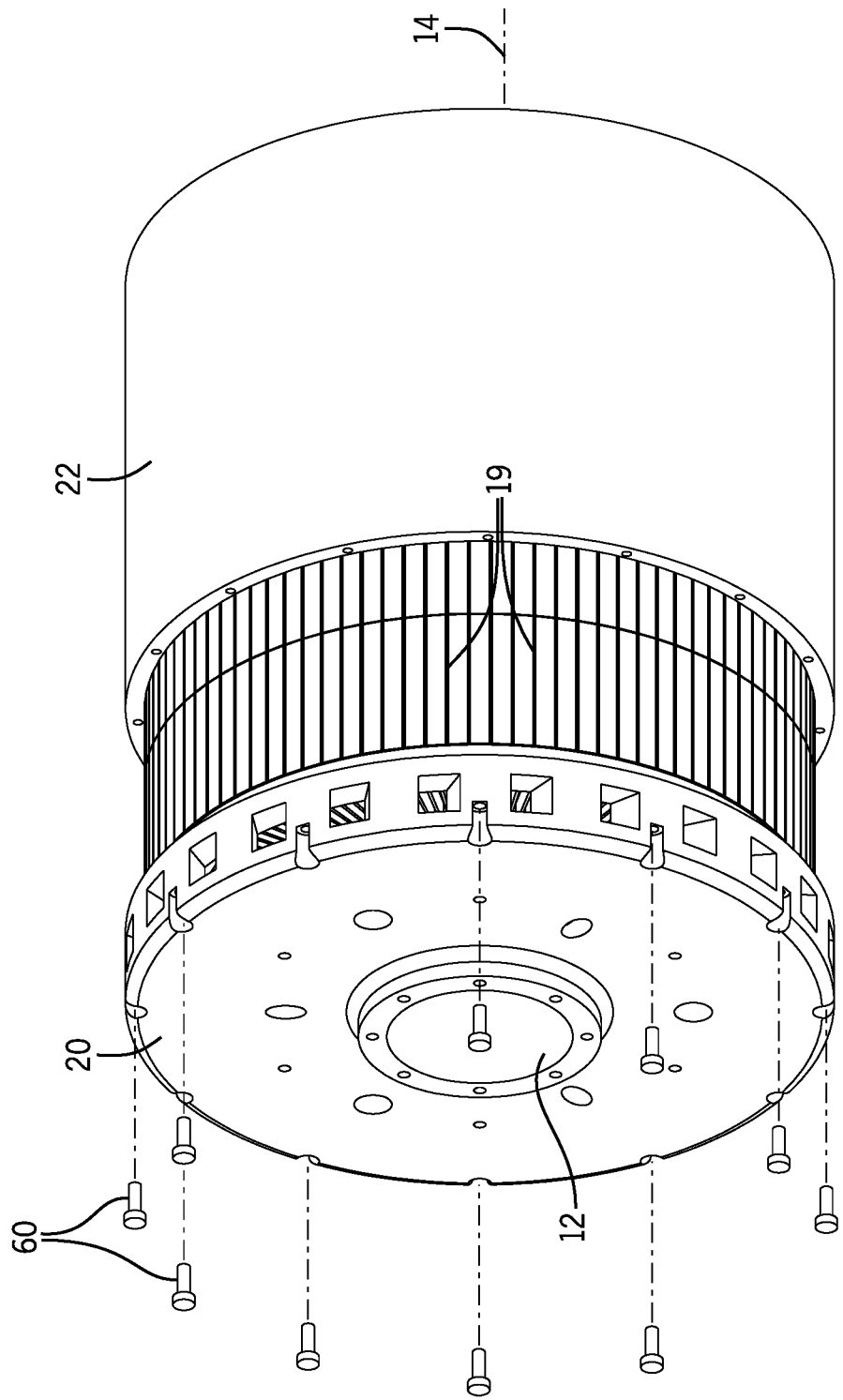
FIG. 6 is a rear perspective view of the endplate and rotor showing an ability to separate the endplate from the magnet form for assembly and inspection.

Referring now to FIG. 6, the endplate 20 may be separated from the permanent magnet frame 22 as normally held together with a set of machine screws 60 passing through holes in the periphery of the endplate 20 into the rear edge of the permanent magnet frame 22. In this way, the permanent magnet frame 22 may be separated from the permanent magnet frame 22 for simplicity in assembling the magnets, inspection, and the like.

Figure 7:
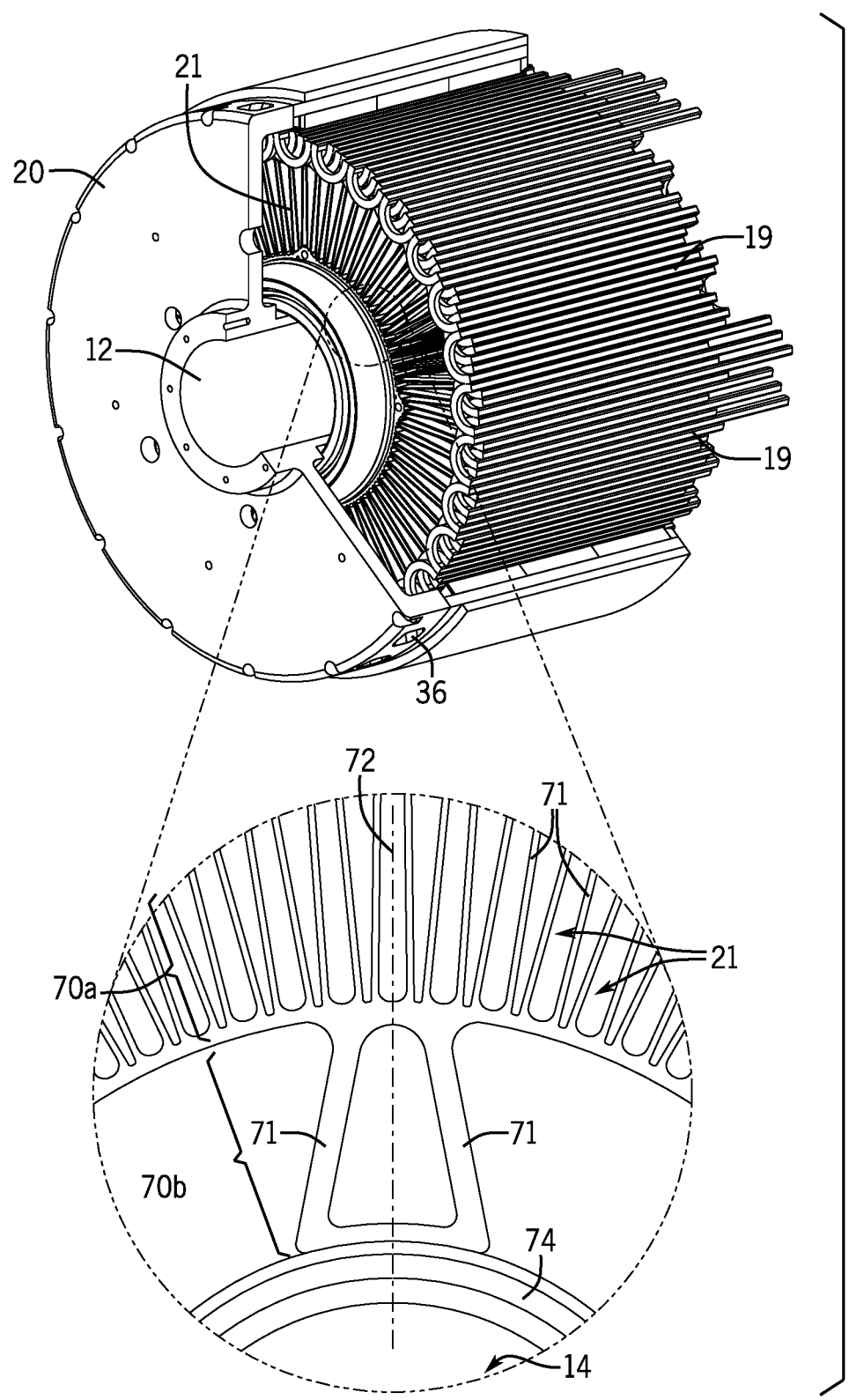
FIG. 7 is a partial rear cutaway in perspective of a two-level configuration of stator fins showing the fins in a front elevational view as an inset.

Referring now to FIG. 7, the heatsink fins 21 passing from the inner surface of the stator 18 toward the shaft 12 may provide for an outer zone 70a at a greater distance from the axis 14 than an inner zone 70b. The heatsink fins 21 in the outer zone 70a may be generally planar plates 71 extending approximately radially but angled with respect to true lines of radius 72 so as to provide improved torque conduction. In this respect, adjacent plates 71 may have equal and opposite angulation with respect to the true lines of radius 72.

The number of plates 71 are greatly reduced in zone 70b allowing a reduction in weight recognizing the decreasing heat interface area as one moves toward the axis 14 and a reduced size of the shaft 12. The latter set of plates 71 in zone 70 may connect to an inner tube 74 which is supported against the bearing set 32 shown in FIG. 1.

Figure 8:
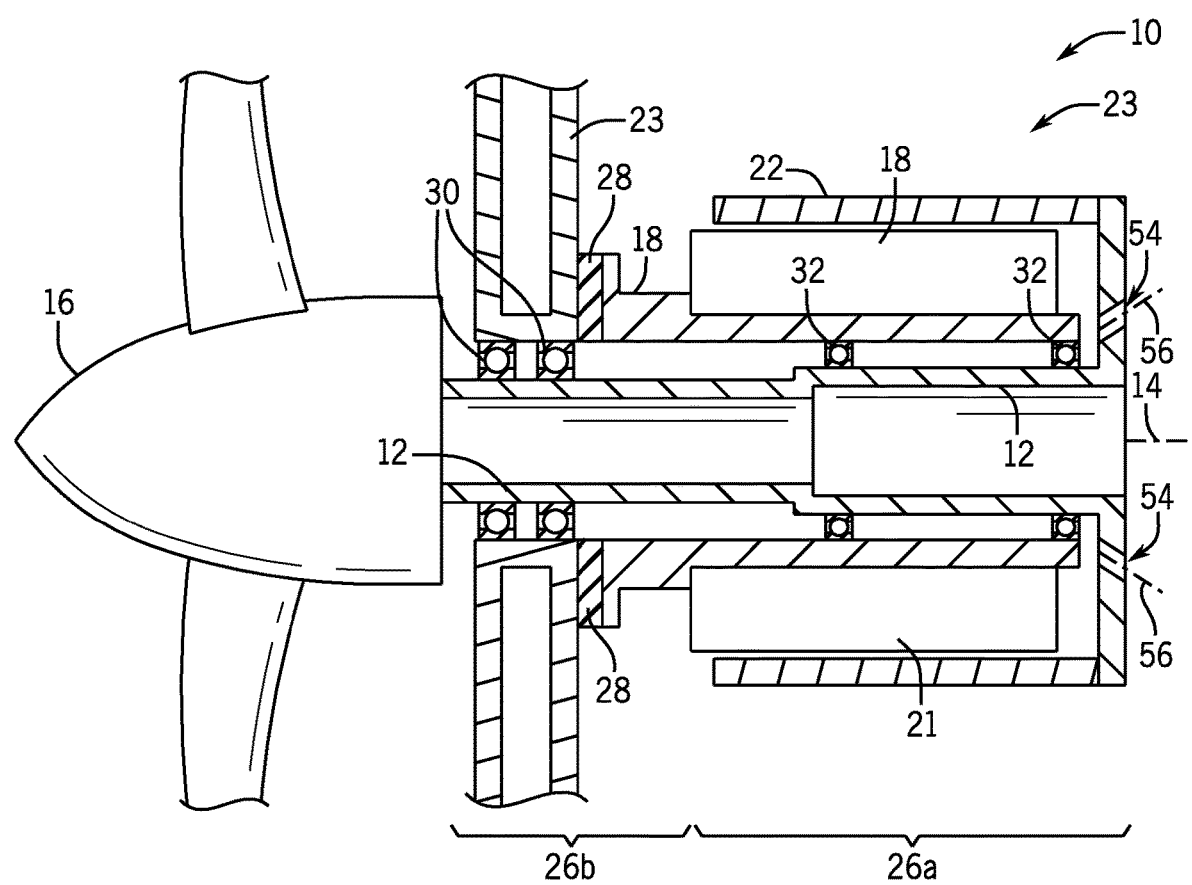
FIG. 8 is a figure similar to that of FIG. 2 showing an alternative embodiment in which the flexible isolator is positioned between the frame and the stator.

Referring now to FIG. 8, in an alternative embodiment, the flexible coupling 28 may be positioned between the stator 18 and the frame 23 and the shaft 12 may be continuous or may also include a flexible coupler 28 as depicted in FIG. 2. In both cases, the flexible couplings 28 serve to isolate or limit forces that affect the separation between the stater 18 and the permanent magnet frame 28 allowing close tolerance.

Figure 9A:
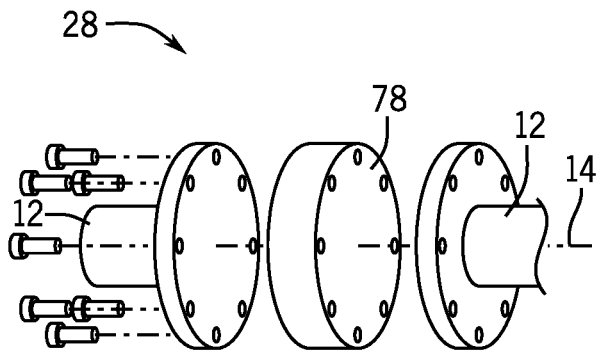
FIGS. 9a-9f are simplified perspective views of flexible isolators favoring axial and radial motion over tortional motion.
Figure 9B:
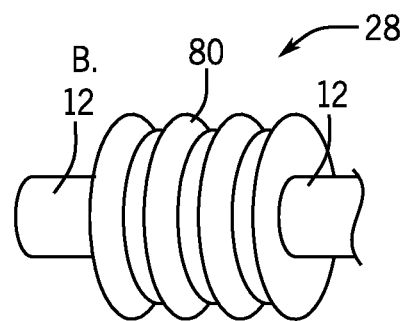
Figure 9C:
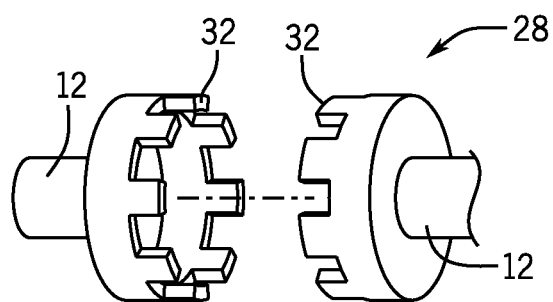
Figure 9D:
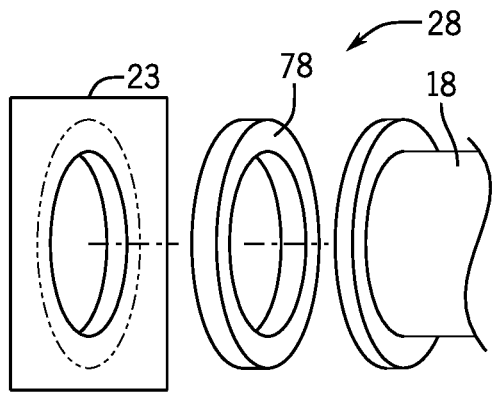

Referring now to FIGS. 9a-9c, it will be appreciated that the flexible coupling 28 in both cases preferentially passes torque along axis 14 while allowing compliance or movement between its ends axially or radially with respect to axis 14. Referring to FIG. 9a, this may be accomplished by a polymeric element 78 sandwiched between flanges on the shaft 12 or as shown in FIG. 9d between the frame 23 and the stator 18. The polymeric element 78 provides isolation by allowing limited compliance that is quickly reached in continuous torque but not reached an axial or radial vibration. The size and shape of the polymeric element 78 may also preferentially favor torque transmission.

Figure 9E:
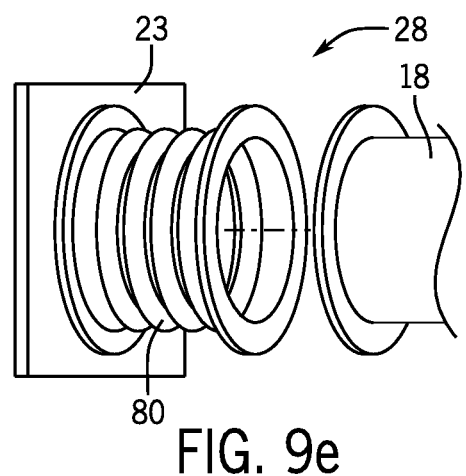
Figure 9F:
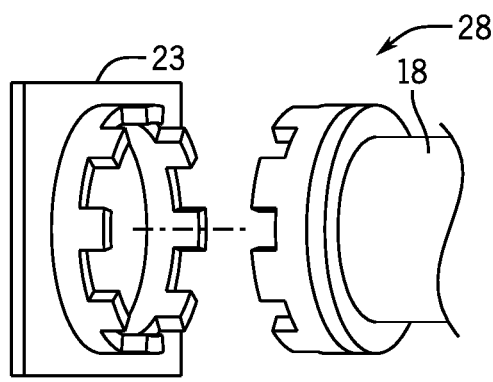

Referring to FIG. 9a, an alternative flexible coupling 28 may use a metallic bellows 80 that can provide axial and radial compliance without substantial torsional compliance. The bellows 80 may be positioned between the shaft portions 26a and 26b or between the frame 23 and the stator 18 as shown in FIG. 9e.

Referring to FIG. 9c, an alternative form employs interengaging gears or teeth structures 82 which transmit torque but allow axial and radial compliance. The teeth may be separated by elastomeric polymer elements to reduce vibration. Again the teeth structures 82 may be placed between portions of the shaft 12 or between the frame 23 and the stator 18.

It will be appreciated that other flexible couplings providing similar function may also be used including, for example, structures using tensioned struts extending along lines of torsion to allow axial and radial compliance with movement of the struts out of plane.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including", and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What we claim is:

1. An electric machine comprising:
a frame;
a stator providing a stator body having a circumferential periphery supporting a series of electrically independent coils facing outward and spaced therealong;
a rotor providing a rotatable shaft passing through the stator to a first end that is attached to an endplate extending radially from the shaft to a periphery having a diameter outside of the stator and joining an end of a permanent magnet form coaxially surrounding the stator and supported in cantilever thereby;

a first bearing assembly supporting a first portion of the shaft that joins an outer surface of the shaft and an inner portion of the stator restraining relative motion between the stator and rotor to coaxial rotation;

a second bearing assembly supporting a second portion of the shaft against the frame to restrain relative motion between the second portion of the shaft and the frame to coaxial rotation;

a flexible coupler positioned between at least one of a first portion of the rotatable shaft and a second portion of the rotatable shaft and between the stator and the frame isolating the stator and rotor from relative radial or axial force.

2. The electric machine of claim 1 wherein the flexible coupler is an elastically compliant coupler providing a lower constant of elasticity to axial and radial forces than to torsional forces during operation.

3. The electric machine of claim 2 wherein the first and second bearing assemblies are each a pair of bearings axially spaced in separation along the rotatable shaft.

4. The electric machine of claim 1 wherein the first and second bearing assemblies are thrust bearings.

5. The electric machine of claim 1 wherein the flexible coupler is selected from the group consisting of elastomeric couplers, bellows couplers, and interdigitated couplers.

6. The electric machine of claim 1 wherein the stator provides a set of heatsink fins extending inwardly from the series of electrically independent coils toward the rotatable shaft.

7. The electric machine of claim 6 wherein the endplate includes a set of peripheral openings allowing radial airflow out of the endplate and out of the rotor volume.

8. The electric machine of claim 7 wherein the endplate further includes a set of radially extending fan blades conducting air to the peripheral openings.

9. The electric machine of claim 7 wherein the peripheral openings have center axes tipped from a radial direction away from a direction of rotation.

10. The electric machine of claim 7 wherein the heatsink fins are angled with respect to lines of radius perpendicular to an axis of rotation of the shaft.

11. The electric machine of claim 10 wherein pairs of adjacent fins diverge symmetrically from the lines of radius.

12. The electric machine of claim 11 wherein the fins are planar.

13. The electric machine of claim 6 wherein a number of fins around a circumference of the shaft decreases toward the shaft.

14. The electric machine of claim 1 wherein the endplate includes a set of openings allowing viewing of at least one of the first pair of bearings.

15. The electric machine of claim 1 wherein the endplate is releasably attached to the permanent magnet form with machine screws.

16. The electric machine of claim 1 wherein the endplate is releasably attached to the permanent magnet form with machine screws.

17. The electric machine of claim 1 wherein the flexible coupler is positioned between the first portion of the rotatable shaft and a second portion of the rotatable shaft.

* * * * *